United States Patent Office
3,253,083
Patented May 24, 1966

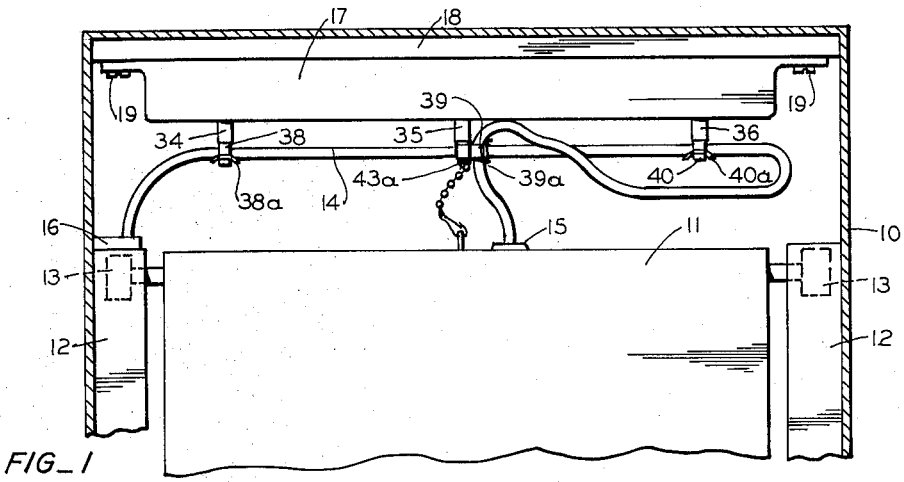
FIG_1
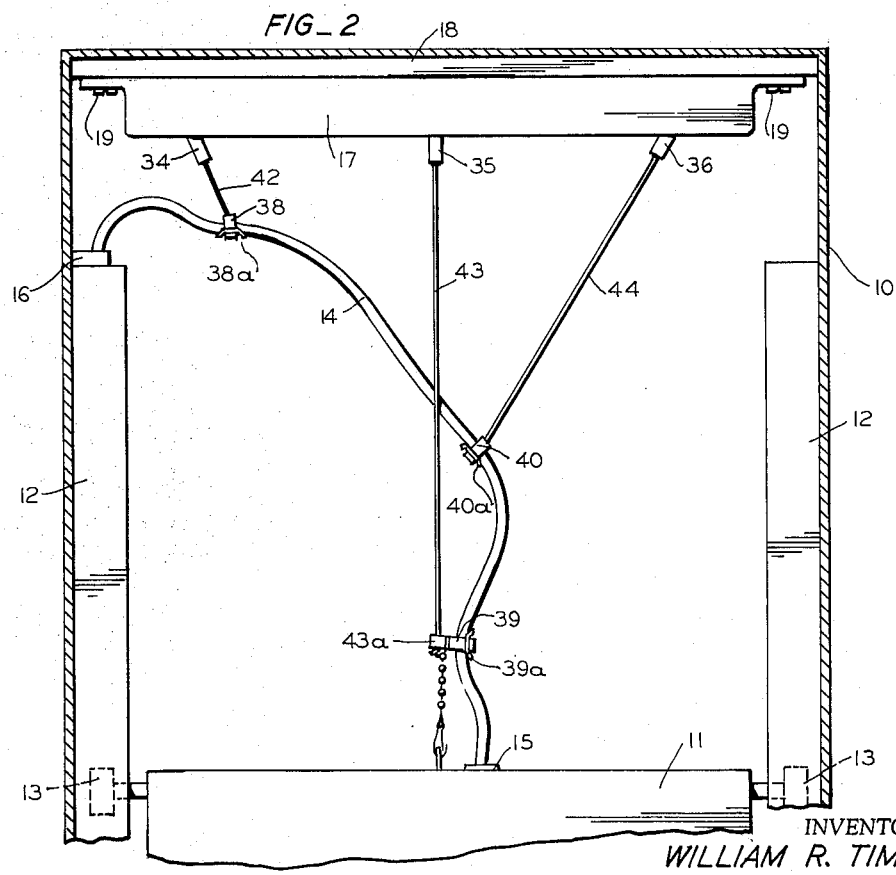
FIG_2
INVENTOR.
WILLIAM R. TIMBERS
BY
ATTORNEYS

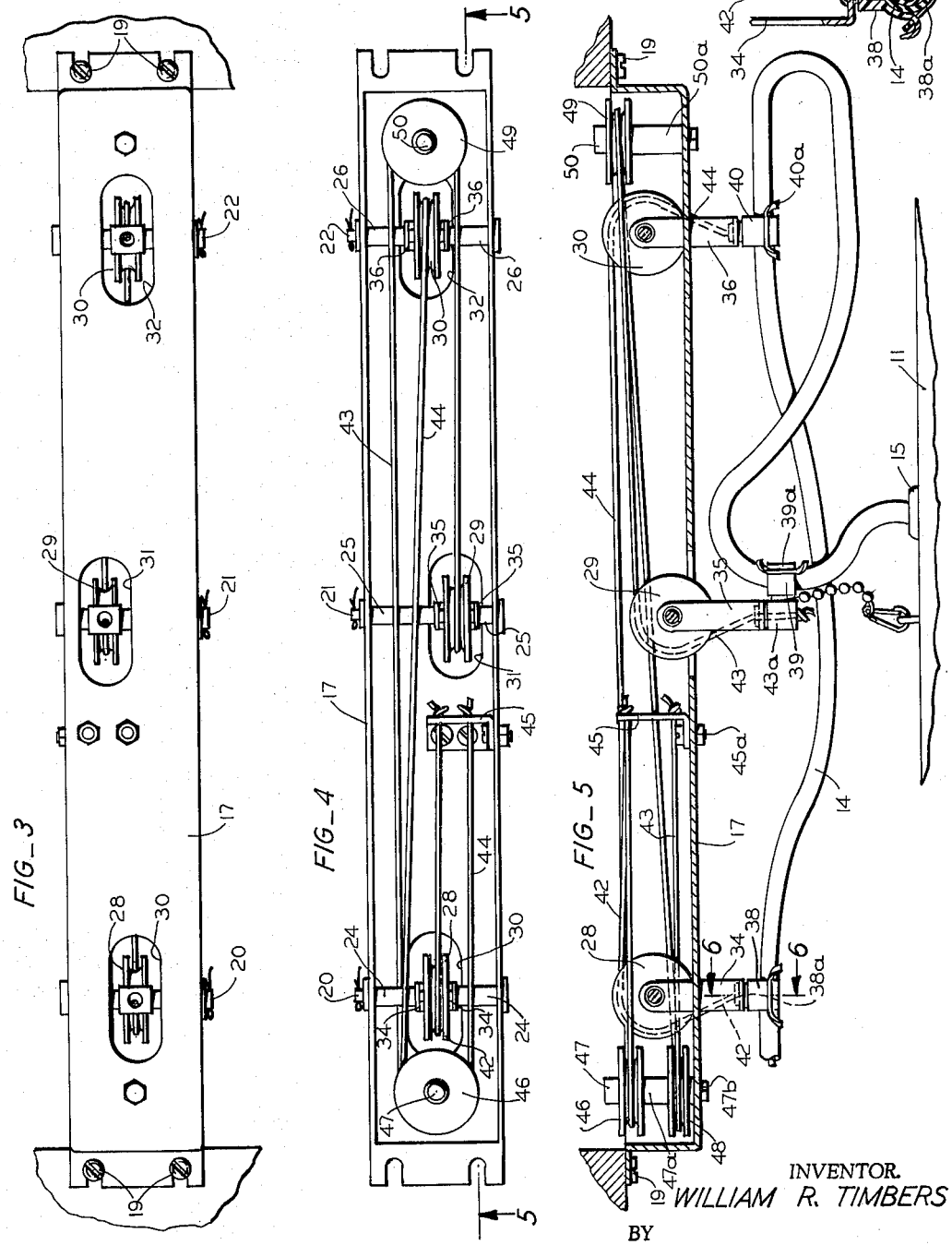

3,253,083
CABLE RETRACTOR FOR USE WITH
EXTENDABLE CHASSIS
William R. Timbers, 721 Nutmeg Ave., Sunnyvale, Calif.
Filed Oct. 8, 1962, Ser. No. 228,896
7 Claims. (Cl. 174—52)

This invention relates to cable retractors in general. More particularly this invention relates to an improved cable retractor for use with electronic apparatus.

An object of this invention is to provide an improved cable retractor for use with an extendable chassis of an electronic apparatus whereby the cable connection to the extendable chassis is held in a predetermined manner during the extending and retracting movements thereof.

Another object of this invention is to provide an improved cable retractor for the extendable chassis of an electronic apparatus, said cable retractor having a plurality of elastic members of different length attached to the cable of the electronic apparatus at different points so that these elastic members function to hold the cable in predetermined manner as the chassis is extended from the cabinet supporting the chassis, and also as the chassis is retracted into the cabinet.

Other and further objects of this invention will be apparent to those skilled in the art to which it relates from the following specification, claims and drawing.

In accordance with this invention, there is provided an improved cable retractor for use with the extendable frame or chassis of electronic apparatus so as to hold the cable attached to the electronic apparatus in predetermined manner as the chassis is extended from the cabinet supporting such chassis. The retractor assembly of this invention is provided with a channel shaped frame member which is adapted to be attached to the cabinet structure behind the extendable chassis of the electronic apparatus.

Inside of this channel shaped frame there are positioned elastic members each of which have one end thereof fixedly attached or anchored to the channel shaped frame member. These elastic members are of different lengths which vary from a short length to a relatively long length and these lengths depend upon the particular installation with which the cable retractor is to be employed. Thus in the particular retractor arrangement illustrated the outer end of the short length elastic member is coupled by a clamping member to the cable of the electronic apparatus a short distance from the point at which such cable is firmly attached to the inside of the cabinet structure adjacent to the retractor channel member. The outer end of the relatively long elastic member is coupled by a suitable clamping member to the electronic apparatus cable adjacent to the portion of this cable which enters the rear end of the extendable chassis. This relatively long elastic member is also provided with a short length of chain or other suitable linkage whereby it is removably coupled to the rear end of the extendable chassis so that at least a part of the pull of this relatively long elastic member is exerted on the chassis of the electronic apparatus, when this chassis is extended, rather than upon the cable leading to the electronic apparatus. Also an elastic member of intermediate length is attached to an intermediate portion of the cable leading to the electronic apparatus. Thus as the chassis of the electronic device is withdrawn from the cabinet for inspection, servicing, use or otherwise, the aforesaid elastic members of different lengths function to shape the cable, in a predetermined manner, as it extends from the inside rear part of the cabinet toward the rear of the extended chassis. Also, when the chassis of the electronic apparatus is retracted into the cabinet these elastic members function to fold the cable in a predetermined manner along the front of the frame member of the retractor assembly.

An important feature of this apparatus is the provision of suitable sheaves inside of the channel shaped frame member of the retractor assembly for guiding the elastic members during the operation of this apparatus and also for supporting these elastic members in such a manner that they do not become tangled up.

Further details and features of this invention will be set forth in the following specification, claims and drawing in which briefly:

FIG. 1 is a fragmentary sectional view of the cabinet structure and electronic apparatus chassis showing the electronic apparatus retracted in the cabinet and showing the cable connected thereto in retracted position;

FIG. 2 is a fragmentary sectional view similar to FIG. 1 showing the elastic members of the cable retracting apparatus of this invention extended when the chassis of the electronic apparatus is extended from the cabinet structure;

FIG. 3 is a front view of the cable retractor assembly of this invention;

FIG. 4 is a back view of the retractor assembly;

FIG. 5 is a sectional view of the cable retractor assembly taken along the line 5—5 of FIG. 4 and also showing the cable of the electronic apparatus attached to the elastic members of the retractor assembly; and FIG. 6 is a sectional view along the line 6—6 of FIG. 5.

Referring to the drawing in detail, there is illustrated an embodiment of this cable retractor installed inside of the cabinet structure 10 directly behind the rear of the electronic apparatus chassis 11. The electronic chassis 11 is provided with suitable supporting rollers 13 which are rotatably attached thereto and cooperate with the rails 12 that are attached inside of the cabinet structure 10 for supporting the chassis so that the chassis may be extended from the cabinet 10 to the front thereof for inspection, use or servicing of the electronic apparatus supported by the chassis. A suitable cable 14 containing various connecting wires extends from the rear of the chassis 11 through the grommet 15 to the pipe or fitting 16 that is provided inside of the cabinet structure near the rear wall thereof.

The cable retractor is provided with a channel shaped frame 17 that is attached to the back 18 of the cabinet structure by means of suitable bolts or machine screws 19. The retractor assembly is provided with sheave supporting shafts 20, 21 and 22 on which the small sheaves 28, 29 and 30 respectively are supported. Suitable spacer sleeves 24, 25 and 26 are provided to these shafts 20, 21 and 22, respectively, for spacing the sheaves 28, 29 and 30, respectively, from the side walls of the retractor frame 17.

Holes 30, 31 and 32 are provided in the front of the frame 17 and the sheaves 28, 29 and 30 are positioned in line with these respective holes. Thus the U-shaped members 34, 35 and 36 which straddle the sheaves 28, 29 and 30, respectively, and are supported on the shafts 20, 21 and 22, respectively, are aligned with the holes 30, 31 and 32, respectively, and extend therethrough to the front of the frame 17 as shown in FIG. 5.

The cable 14 is supported by means of clamping members 38-38a, 39-39a and 40-40a. These clamping members may be made of plastic or other suitable material. The parts 38, 39 and 40 thereof are generally U-shaped and they are made substantially of rigid insulation material to receive the cable in a snug manner. The ends of these parts are made of hook-shape so that the elastic loop 38a may be hooked thereby for holding the cable 14 clamped between the U-shaped part and the elastic loop. Cable support 38 is provided with a hole for receiving the end portion of the elastic member 42 and this elastic member is provided with a knot in the end portion thereof which prevents it from being withdrawn from the member 38.

Elastic member 42 is relatively short and extends around the sheave 28 to the anchoring member 45 which is attached to the frame 17 by means of the bolt 45a. Thus the inside end of the elastic member 42 is provided with a knot which prevents it from slipping away from the anchoring member 45. A slight amount of tension is provided to this elastic member 42 when the cable supporting member 38 is positioned against the U-shaped member 34 so that this member 38 is held snugly against the member 34 when the cable is in retracted position. When the cable is in extended position as shown in FIG. 2 the member 38 which is attached to the elastic member 42 is pulled a short distance away from the U-shaped member 34.

The elastic member 44 is of intermediate length having a length intermediate that of the elastic members 42 and 43. The outer end of elastic member 44 is knotted inside of the cable clamp 40 so that as this cable clamp is moved away from the retractor frame, that is during the outward movement of the chassis 11, the elastic member 44 is stretched as shown in FIG. 2. The elastic member 44 passes around the sheave 30 and around sheave 46, which is supported by the stud 47 on the frame 17, and from the sheave 46 it passes to the anchoring member 45 to which it is attached. The outer end portion of elastic member 43 is attached to a fitting 43a to which the cable clamp 39 is attached by means of a suitable screw so that this cable clamp extends from one side of the member 43a. This arrangement is desirable since the clamp 39 is attached to the cable 14 relatively close to the chassis 11. The elastic member 43 passes around the sheave 29 and around sheave 49 which is attached to the retractor frame 17 by means of the stud 50. From sheave 49 the elastic member 43 passes to sheave 48 and around this sheave to the member 45 on which it is anchored. Suitable spacer sleeves 47a and 47b are provided to the stud 47 for spacing the sheaves 46 and 48 from each other and for spacing sheave 48 from the frame. Also a suitable sleeve 50a is provided to the stud 50 for spacing the sheave 49 from the frame.

The elastic members 42, 43 and 44 are under a certain amount of tension when the cable 14 is in retracted position and at this time the cable clamps 38 and 40 are held snugly against the members 34 and 36 respectively while the member 43a which is attached to the cable clamp 39 is held snugly against member 35. As the cable 14 is unfolded during the withdrawal of the chassis 11 from the cabinet structure 10 the elastic members 42, 43 and 44 stretch as shown in FIG. 2 and allow the cable to be unfolded in a predetermined manner. When the chassis is moved into its retracted position the elastic members 42, 43 and 44 function to fold the cable 14 as shown in FIG. 1 and during this operation the various sheaves rotate to allow the tension on the elastic members to be distributed over the lengths thereof.

While I have shown a preferred embodiment of the invention, it will be understood that the invention is capable of variation and modification from the form shown so that its scope should be limited only by scope of the claims appended hereto.

What I claim is:

1. In a cable retractor for electronic apparatus the combination of a chassis for electronic apparatus, cabinet structure having a recess receiving said chassis in said recess so that said chassis may be extended out of said recess, an electric cable extending between said chassis and said cabinet structure, elongated elastic members of different lengths each having one end attached to said cabinet structure, and means attaching the other ends of said elongated elastic members to different points of said cable supporting said cable folded in a predetermined manner when said chassis is positioned in said recess and said elastic members are in retracted condition for permitting said cable to be unfolded when said chassis is extended out of said recess and said elastic members are in stretched condition.

2. In a cable retractor for electronic apparatus the combination of a chassis that is adapted to be extended from its supporting cabinet structure and retracted therein, said chassis having a cable extending therefrom, a frame member, a plurality of elongated elastic means, means attaching one end of each of said elastic means to said frame member, means attaching the other end of different ones of said elastic means to different points of the cable of the electronic apparatus so that said elastic means exerts a pulling force on said cable with respect to said frame and holds said cable in a predetermined manner as the chassis of the electronic apparatus is positioned in the cabinet structure and as it is extended therefrom.

3. In a cable retractor for electronic apparatus the combination of a chassis that is adapted to be extended from its supporting cabinet structure and retracted therein, said chassis having a cable extending therefrom, having a frame member, a plurality of elongated elastic members, a hollow member attached to said frame member, means attaching one end of each of said elastic members to the inside of said hollow member, means attaching different ones of said elastic members to different points of the cable of the electronic apparatus so that said elastic members exert a pulling force on said cable as said elastic members are drawn from said hollow member and hold said cable in a predetermined manner as the chassis of the electronic apparatus is positioned in the cabinet structure and as it is extended therefrom.

4. In a cable retractor for electronic apparatus the combination of a chassis that is adapted to be extended from its supporting cabinet structure and retracted therein, said chassis having a cable extending therefrom, a frame member, a plurality of elongated elastic members of different lengths, a hollow member attached to said frame member, means attaching one end of each of said elastic members to the inside of said hollow member having apertures through which said elastic members are adapted to extend, guide means pivotally attached to said hollow member extending out of said apertures for guiding said elastic members, means attaching one end of each of said elastic members to a different point of said cable of the electronic apparatus so that different ones of said elastic members exert a pulling force on different points of said cable with respect to said frame and hold said cable in a predetermined manner as the chassis of the electronic apparatus is positioned in the cabinet structure and as it is extended therefrom.

5. In a cable retractor for electronic apparatus the combination of a chassis that is adapted to be extended from its supporting cabinet structure and retracted therein, said chassis having a cable extended therefrom, a frame member, a plurality of elongated elastic members of different lengths, means attaching one end of each of said elastic members to said frame member, a plurality of rotatable means supporting said elastic members in said frame member, means attaching said elastic members of different lengths to different points of the cable of the electronic apparatus so that said elastic members exert a pulling force on said cable with respect to said frame when said elastic members are stretched and hold said cable in a predetermined manner as the chassis of the electronic apparatus is positioned in the cabinet structure and as it is extended therefrom.

6. In a cable retractor for electronic apparatus the combination of a chassis that is adapted to be extended from its supporting cabinet structure and retracted therein, said chassis having a cable extending therefrom, a frame member, a plurality of elongated elastic members of different lengths, means attaching one end of each of said elastic members to said frame member, a plurality of sheaves rotatably supported on said frame member supporting said elastic members, means attaching said elastic members of different lengths to different points of the cable of the electronic apparatus so that said elastic members exert a pulling force on said cable with respect to said frame and hold said cable in a predetermined manner as the chassis of the electronic apparatus is positioned in the cabinet structure and as it is extended therefrom.

7. In a cable retractor for electronic apparatus the combination of a chassis that is adapted to be extended from its supporting cabinet structure and retracted therein, said chassis having a cable extending therefrom, a frame member, a plurality of elongated elastic members of different lengths, means attaching one end of each of said elastic members to said frame member, a plurality of sheaves rotatably supported on said frame member supporting said elastic members, said frame member having holes formed therein opposite said sheaves through which said elastic members extend from said frame member, means attaching said elastic members of different lengths to different points of the cable of the electronic apparatus so that said elastic members exert a pulling force on said cable with respect to said frame and hold said cable in a predetermined manner as the chassis of the electronic apparatus is positioned in the cabinet structure and as it is extended therefrom.

References Cited by the Examiner

UNITED STATES PATENTS

| | | | |
|---|---|---|---|
| 489,815 | 1/1893 | Hume | 191—12 X |
| 1,000,045 | 8/1911 | Spicer | 248—330 X |
| 2,117,928 | 5/1938 | Wardell. | |
| 2,865,979 | 12/1958 | Klassen | 174—69 |
| 3,061,252 | 10/1962 | Berry et al. | |
| 3,120,411 | 2/1964 | Strumpell | 174—69 X |

FOREIGN PATENTS 682,495   10/1939   Germany.

ROBERT K. SCHAEFER, *Primary Examiner.*

JOHN P. WILDMAN, JOHN F. BURNS, *Examiners.*

J. P. MOHN, D. L. CLAY, *Assistant Examiners.*